E. KUEBLER AND O. NIEDERBERGER.
HOLDER FOR GROWING PLANTS.
APPLICATION FILED DEC. 16, 1920.
1,407,664.
Patented Feb. 21, 1922.
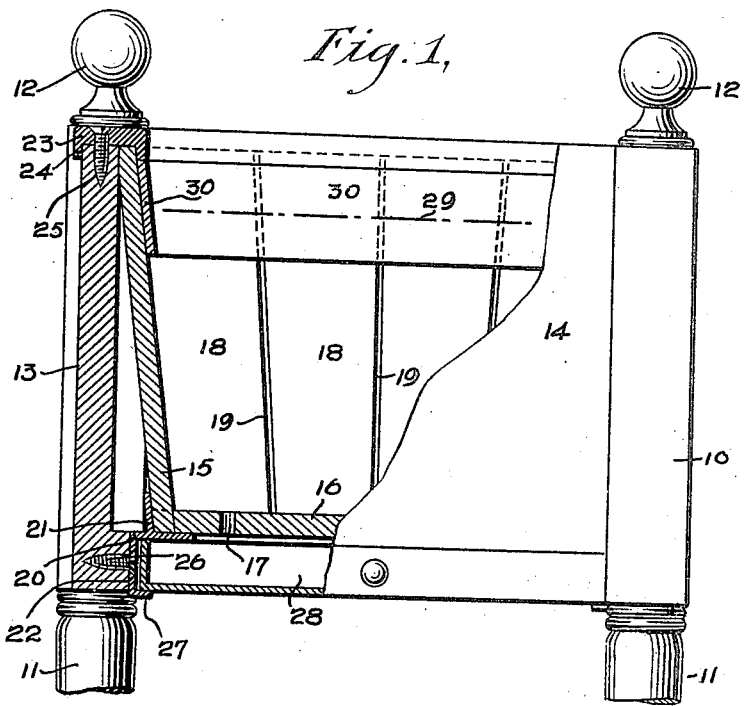
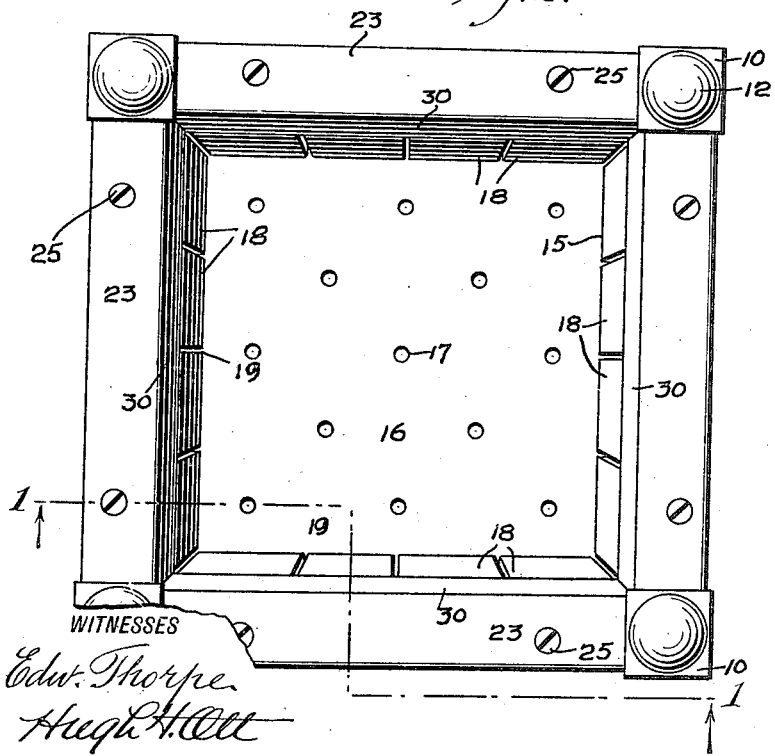
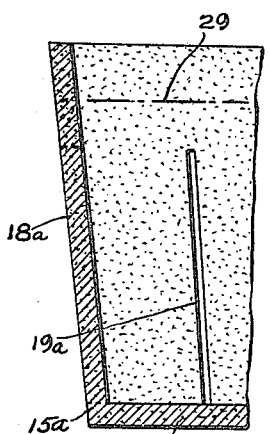
INVENTORS
ELIAS KUEBLER
OTTO NIEDERBERGER
ATTORNEYS

UNITED STATES PATENT OFFICE.

ELIAS KUEBLER AND OTTO NIEDERBERGER, OF NEW YORK, N. Y.

HOLDER FOR GROWING PLANTS.

1,407,664.  Specification of Letters Patent.  Patented Feb. 21, 1922.

Application filed December 16, 1920. Serial No. 431,162.

*To all whom it may concern:*

Be it known that we, ELIAS KUEBLER and OTTO NIEDERBERGER, both citizens of Germany, and residents of the city of New York, borough of Manhattan, in the county and State of New York, have invented a new and Improved Holder for Growing Plants, of which the following is a full, clear, and exact description.

This invention relates to plant holders and more particularly to a receptacle for growing plants which is especially designed for indoor use, the same being an improvement over a similar device set forth in Letters Patent of the United States granted March 16th, 1920 and bearing No. 1,334,069.

In the former application, the side plates were spaced to permit of the entrance of air to the soil contained in the receptacle but due to the fact that these spaces extended above the upper level of the soil, when water was poured thereon, it had a tendency to escape through the openings before it was absorbed by the soil.

It is therefore one of the principal objects of the present invention to overcome the above recited objection by providing means for closing the portion of the openings extending above the level of the soil.

Another object of the invention is to improve the general appearance of the structure by providing a novel form of drain pan which receives the drainage from the soil contained in the receptacle.

With the above recited and other objects in view, some of which will appear more clearly hereafter, reference is made to the following specification, the appended claim and the accompanying drawings, in which:

Figure 1 is a fragmentary front elevation of the plant receptacle constructed in accordance with the invention, parts being shown in section to disclose the underlying structure.

Figure 2 is a plan view thereof.

Figure 3 is a fragmentary sectional view of a slightly modified form of the invention.

Referring to the drawings by characters of reference, the holder comprises a rectangular structure preferably of wood, having corner posts 10 formed to provide supporting legs 11 at their lower ends and having ornamental knobs 12 at the upper ends thereof. A plurality of side and end walls 13 and 14 are secured between the corner posts. The soil receptacle 15 comprises a bottom 16 having drainage perforations 17 and side and end walls consisting of a plurality of slats 18 which are normally spaced from each other to provide intervening openings 19 through which air is admitted to the soil contained therein and which permit of relative contraction or expansion. The lower end of the soil receptacle is supported upon a rectangular metallic supporting frame 20 which is provided with upstanding integral side and end flanges 21 and depending integral side and end flanges 22. The upper edges of the slats 18 are flush with the upper edges of the side walls 13 and 14 and rest against the inner surface of said walls 13 and 14. Covering strips 23 having longitudinal recesses 24 in their undersides receive and embrace the upper edges of the side and end walls 13 and 14 and the slats 18. The strips 23 are preferably secured by screws 25 to the walls 13 and 14 and the frame 20 is preferably secured by the screws 26 to the lower portion of the side walls. By this arrangement it is obvious that the slats 18 are free to move sidewise relative to one another to permit of the contraction and expansion of the same. The lower edges of the depending side flanges 22 are bent inwardly to provide the heads 27 which constitute supports for a sliding drawer 28 which functions as a removable drip pan to receive the drainings from the soil receptacle. In order to provide means for closing the upper portions of the openings 19 which extend above the soil level indicated at 29, use is made of the depending baffle strips 30 which are placed within the receptacle immediately below the lower edges of the covering strips 23. By this arrangement it is obvious that in watering the soil, the water is effectively prevented from escaping through the openings above the soil level and is compelled to percolate through the soil, as the lower edges of the baffle plates 30 are designed to extend an appreciable distance below the soil level.

In the modification illustrated in Figure 3 of the drawings the receptacle 15ª is illustrated as constructed from earthenware or similar material which is provided with a bottom 16ª and integral side and end walls 18ª which are slotted as at 19ª, said slots terminating an appreciable distance from the upper edge to provide openings for entrance of air. The upper ends of the slots terminating below the upper edge of the side and end walls 18ª, serve as a means to prevent the escape of water from the receptacle above the soil level indicated at 29.

From the foregoing, it is to be understood that the right is reserved to embodiments other than those actually illustrated herein, to the full extent indicated by the general meaning of the terms in which the claim is expressed and by variations in the phraseology of the same.

We claim:—

A growing plant holder, comprising a plurality of vertical columns, side walls secured therebetween, recessed strips engaged at the upper ends of said columns, to which said side walls are secured, an angular metallic frame secured to the bottom of said side walls, a soil receptacle including a perforated bottom and a side wall comprising a plurality of vertical slats having their upper ends disposed in the recess of said strips and resting within the angles of said frame at their lower ends, said slats being loosely contained and having spaces between their adjacent edges, and a drip pan adapted to be disposed below the bottom of said soil receptacle for receiving the drippings therefrom, in combination with means for obstructing the spaces between said slats above the level of the soil contained in the receptacle whereby air will be admitted through said spaces and the escape of water will be prevented therethrough above the soil level.

ELIAS KUEBLER,
OTTO NIEDERBERGER.